(No Model.)

J. L. SYMONDS.
TRAP.

No. 246,240. Patented Aug. 23, 1881.

WITNESSES:
Francis McArdle,
C. Sedgwick

INVENTOR:
J. L. Symonds
BY Munn & Co
ATTORNEYS.

UNITED STATES PATENT OFFICE.

JOHN L. SYMONDS, OF DETROIT, MICHIGAN.

TRAP.

SPECIFICATION forming part of Letters Patent No. 246,240, dated August 23, 1881.

Application filed May 25, 1881. (No model.)

*To all whom it may concern:*

Be it known that I, JOHN L. SYMONDS, of Detroit, in the county of Wayne and State of Michigan, have invented certain useful Improvements in Traps, of which the following is a specification.

My invention consists in a new and improved trap formed of two trough or tray shaped wire-netting sections hinged to each other and drawn or pressed toward each other—that is, they are closed by spiral springs on one of the sections, whereby the ends of these springs slide on wires of the opposite section. The trap is provided with a bait-hook having a catch at the upper end, which catches on a bail of the other section and holds the sections separated; but as soon as an animal bites on the bait the bail is released and the springs force the two wire-netting sections together, thus entrapping the animal.

Figure 1:
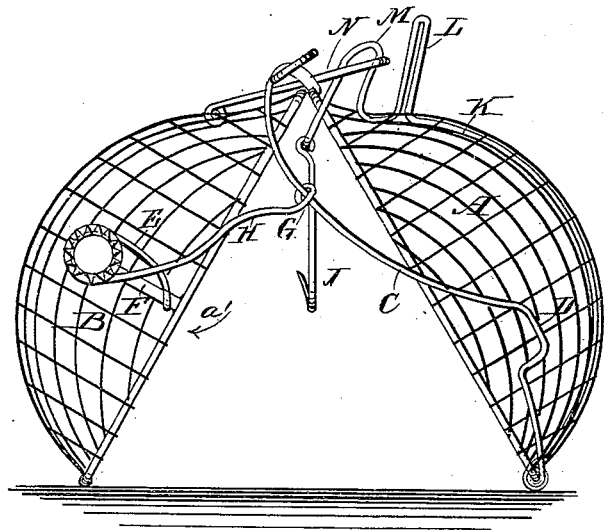
Figure 2:
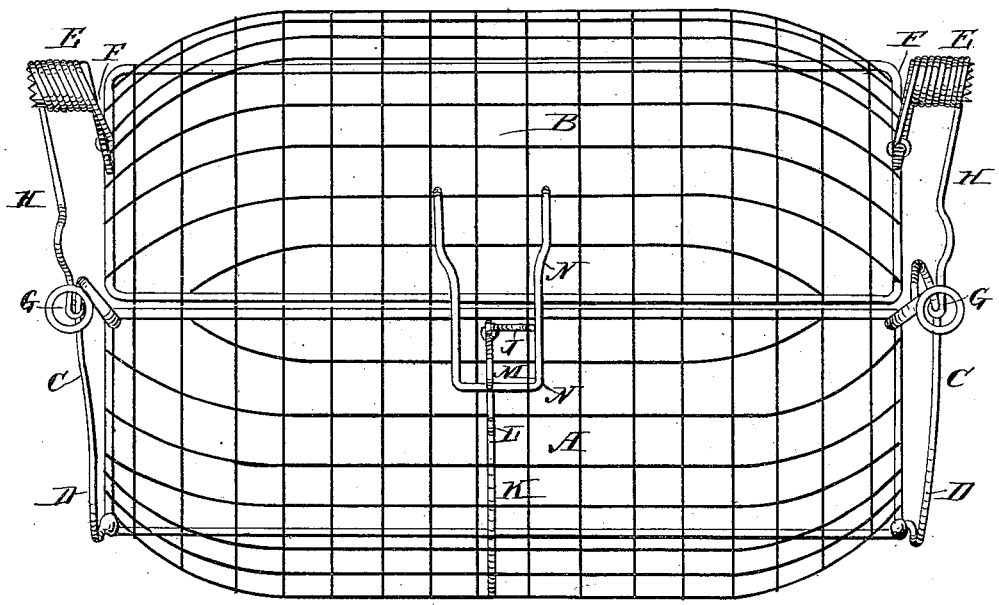

In the accompanying drawings, Figure 1 is an end elevation of my improved trap, showing it open. Fig. 2 is a plan view of the same, showing it in the same position.

Similar letters of reference indicate corresponding parts.

Two trough-shaped wire-netting frames, A and B, are pivoted or hinged to each other at the longitudinal edge. A bent wire, C, with a notch or crook, D, is attached to each end of the frame A in such a manner that it crosses the end of this frame on a curved line, the notch or crook D being near the outer edge of the frame A. A spiral spring, E, is mounted on a projection, F, at each end of the frame B, and an extension or prolongation, H, of this spring is provided with an eye, G, through which the wire C passes. This extension H is bent upward when the frames A and B are separated, and is pressed in the direction of the arrow *a'* by the spring E, thereby closing the trap formed by the two frames A and B. A hook, J, is suspended from the upper end of a wire, K, the opposite end of which is attached to the outer edge of the frame A, this wire being bent the same as the frame A. The wire is provided near its loose upper end with a projection or handle, L, and with a catch, M. The frame B is provided with a bail, N, pivoted thereto.

The trap is opened by pressing the eyes G of the extension H of the springs E toward the upper end of the wires C, and the trap is locked in this position by means of the bail N, which is hooked over the catch M. If the animal bites or nibbles on the bait on the hook J, the catch M will be drawn downward a short distance, sufficiently far to release the bail N. The spring E then presses the extension or arm H of the spring E down, and as this slides along the wire C the two frames A and B are drawn together until the eye G of the extension or arm H passes into the notch or crook D, in which it is retained, thus locking the two sections or frames together, and preventing the animal encaged therein from opening the cage. If the cage is opened, as shown in Fig. 1, the animal can enter into it without stepping over any parts of the cage, and the animals will enter this cage much sooner than one which presents obstacles which might arouse their suspicions.

I am aware that globe-shaped wire frames made in two sections hinged together have been used as fish-traps; but

What I claim is—

1. The combination, with the two pivoted frames A B, of the bent wire C, having the crook D, and attached to each end of section A, the spiral spring E, mounted on a projection, F, at each end of frame B, and having the extension H, with an eye to receive the wire C, as shown and described.

2. The combination, with the bait-hook J and the bail N, pivoted to the section B, of the bent wire K, secured at one end to the section A, and provided with the handle L and catch M, substantially as and for the purpose set forth.

JOHN LEE SYMONDS.

Witnesses:
JOHN L. DALECKE,
JOHN H. CROOK.